US006816479B1

(12) United States Patent
Euget et al.

(10) Patent No.: US 6,816,479 B1
(45) Date of Patent: Nov. 9, 2004

(54) METHOD AND SYSTEM FOR PRE-LOADING IN AN NBBS NETWORK THE LOCAL DIRECTORY DATABASE OF NETWORK NODES WITH THE LOCATION OF THE MORE FREQUENTLY REQUESTED RESOURCES

(75) Inventors: Guy Euget, Vence (FR); Didier Giroir, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 09/664,932

(22) Filed: Sep. 19, 2000

(30) Foreign Application Priority Data

Oct. 21, 1999 (EP) ............................................. 99480111

(51) Int. Cl.[7] ............................................... H04L 12/28
(52) U.S. Cl. ....................... 370/351; 370/400; 370/231; 370/255
(58) Field of Search ................................. 370/231, 238, 370/239, 253, 255, 351, 400; 379/221; 709/239, 241

(56) References Cited

U.S. PATENT DOCUMENTS

| | | | | |
|---|---|---|---|---|
| 4,914,571 A | * | 4/1990 | Baratz et al. | 707/10 |
| 5,430,727 A | * | 7/1995 | Callon | 370/401 |
| 5,600,638 A | * | 2/1997 | Bertin et al. | 370/351 |
| 6,246,669 B1 | * | 6/2001 | Chevalier et al. | 370/238 |
| 6,349,137 B1 | * | 2/2002 | Hunt et al. | 379/265.06 |

* cited by examiner

*Primary Examiner*—Wellington Chin
*Assistant Examiner*—John Shew
(74) *Attorney, Agent, or Firm*—Daniel E. McConnell; John R. Piynichny; Dillon & Yudell LLP

(57) ABSTRACT

The present invention relates to a method and system for pre-loading access nodes with the location of more frequently requested resources. The method includes declaring each locally supported communication protocol for participating to control message exchanges between nodes supporting a same communication protocol; receiving a message to locate a target resource; searching for information related to the location of the target resource in the Local Directory Database; broadcasting an undirected message to the other access nodes in the network to locate the target resource; receiving a control message from the destination access node providing access to the target resource, this control message comprising information related to the location of the target resource; and storing the information related to the location of the target resource in the Local Directory Database.

18 Claims, 7 Drawing Sheets

High Speed Packet Switching Network

Local Directory Database

"Server Resource Location" Control Message

METHOD AND SYSTEM FOR PRE-LOADING IN AN NBBS NETWORK THE LOCAL DIRECTORY DATABASE OF NETWORK NODES WITH THE LOCATION OF THE MORE FREQUENTLY REQUESTED RESOURCES

BACKGROUND OF THE INVENTION

1. Technical Field

The present invention relates to packet switching networks and more particularly to a method and system, in a network based on a Networking Broadband Services (NBBS) architecture, for dynamically pre-loading the Local Directory Database (LDB) of network nodes with the location of the more frequently requested resources.

2. Background Art

High Speed Packet/Cell Switching Networks

Data transmission is now evolving, with a specific focus on applications and by integrating a fundamental shift in the customer traffic profile. Driven by the growth of the number of intelligent (programmable) workstations, the pervasive use of local area network interconnections, the distributed processing capabilities between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above observations, there is a strong requirement for supporting distributed computing applications across high speed wide-area networks that can carry local area network communications, voice, video and traffic among channel attached hosts, business, engineering workstations, terminals, and small to intermediate file servers. This vision of a high speed multi-protocol network is the driver for the emergence of fast packet switching network architectures in which data, voice, and video information is digitally encoded, chopped into small packets (of fixed or variable length) and transmitted through a common set of nodes and links. An efficient transport of mixed traffic streams on very high speed lines means for these new network architectures, a set of requirements in term of performance and resource consumption which can be summarized as follows:

a very high throughput and a very short packet processing time, an efficient set of flow and congestion control mechanisms, a very large flexibility to support a wide range of connectivity options.

Throughput and Processing Time

One of the key requirements of high speed packet switching networks is to reduce the end to end delay in order to satisfy real time delivery constraints and to achieve the necessary high nodal throughput for the transport of voice and video. Increases in link speeds have not been matched by proportional increases in the processing speeds of communication nodes. The fundamental challenge for high speed networks is to minimize the packet processing time and to take full advantage of the high speed/low error rate technologies. Most of the transport and control functions provided by the new high bandwidth network architectures are performed on an end to end basis. The flow control and particularly the path selection and bandwidth management processes are managed by the access points of the network which reduces both the awareness and the functions of the intermediate nodes.

Congestion and Flow Control

Communication networks have at their disposal limited resources to ensure efficient packet transmissions. An efficient bandwidth management strategy is essential to take full advantage of an high speed network. While transmission costs per byte continue to drop year after year, transmission costs are likely to continue to represent the major expense of operating future telecommunication networks as the demand for bandwidth increases. Thus, considerable efforts have been spent on designing flow and congestion control processes, bandwidth reservation mechanisms, routing algorithms to manage the network bandwidth. An ideal network should be able to transmit an useful traffic directly proportional to the traffic offered to the network and this as far as the maximum transmission capacity is reached. Beyond this limit, the network should operate at its maximum capacity whatever the demand is.

Connectivity

In high speed networks, the nodes must provide total connectivity. This includes attachment of the user devices, regardless of vendor or protocol, and the ability to have the end user communicate with any other device or group of devices (when justified or required). The network must support any type of traffic including data, voice, video, fax, graphic or image. Nodes must be able to take advantage of all common carrier facilities and be adaptable to a plurality of protocols. All needed conversions must be automatic and transparent to the end user.

High Speed Communications

A typical model of communication system is made of several user networks communicating through a high performance network using private lines, carrier provided services, or public data networks. Each user network can be described as a set of communication processors and links interconnecting large computers used as enterprise servers, user groups using workstations or personal computers attached on LAN (Local Area Networks), applications servers, PBX (Private Branch exchange) or video servers. These user networks, spread in different establishments, need to be interconnected through wide area transport facilities and different approaches can be used for organizing the data transfer. Some architectures involve the checking for data integrity at each network node, thus slowing down the transmission. Others are essentially looking for a high speed data transfer. To that end, the transmission, routing and switching techniques within the nodes are optimized to process the packets flowing toward their final destination at the highest possible rate. The present invention belongs essentially to the latter category and more particularly to the fast packet switching network architecture detailed in the following paragraphs.

Networking Broadband Services (NBBS)

The architectures of most high speed packet switching networks specify a set of generic services that offer end-to-end high bandwidth transport capabilities. The present application relates to transmissions in wide-area networks (WANs) based on the IBM's Networking BroadBand Services (NBBS) architecture described in International Business Machine publication "IBM International Technical Support Centers—Networking Broadband Services (NBBS)—Architecture Tutorial—GG24-4486-00" dated June 1995. NBBS Services can be divided into three major areas:

The Transport Services

The Transport Services provide a common infrastructure to support the transfer of information across the network.

They are not used directly but through the Access Services (Access Agents). The Transport Services can be divided into three distinct functions:

a Logical Link Layer, a Network Connection Layer, and the various Transport Protocols.

The Network Control Services

The Network Control Services ensure that the Transport and Access Services operate reliably, efficiently, and as automatically as possible. They are used to control, allocate, and manage the resources of the network on a real-time basis. They also provide network operators with the various facilities that are needed to configure, operate, and maintain the network on a day-to-day basis. This includes facilities for monitoring the performance of the network, accounting for its usage, and resolving problems.

The Access Services

The Access Services (Access Agents) provide an interface between the common high speed network (or backbone network) and external devices or networks via access link interfaces. The Access Services enable a wide range of external devices to get access to the common infrastructure provided by the Transport Services. Together, the Transport, Network Control and Access Services provide the capability to support communications between many different types of communicating devices through a common network infrastructure.

Directory Services

The Directory Services are part of the Network Control Services and are responsible for locating users in the network. Users are connected to external networks, which attach into the network via access agents located in access nodes. The Directory Services function is distributed around all the Directory Agents which reside in Access Agents. They are used on behalf of users when network connections are being established.

The Directory Agent is responsible for the registration and localization of information related to services provided by the Access Agent. The Directory Agent performs, in particular, three main functions:

Registration of users available through its Access Agent.

Localization of users on behalf of the Protocol Agent.

Responding to queries received from other Directory Agents to locate users.

Locating a resource means determining the network addressing information of the Access Agent providing access to the resource. Directory Agents rely on the use of a distributed database. Each Directory Agent maintains a local database comprising information about the external resources accessible through its Access Agent as well as information about remote resources it has cached. The network addressing information of each resource recorded in the local database includes:

an identification of the resource.

the characteristics associated with the resource.

the network addressing information for the resource's Protocol, Connection and Directory Agents.

The Directory search process begins with an external user attempting to communicate with another user using its native protocol. The Protocol Agent within the local Access Agent receiving this request, uses its Directory Agent to find the destination resources. The Directory Agent first examines its local database (also called the Local Directory Database):

If the resource is found locally, the network addressing information is verified via point-to-point network control messages (if necessary) and then forwarded to the origin Protocol Agent.

If the Resource is not found locally in the database, a query is broadcasted to all the Directory Agents in the directory set to which the destination belongs. Results of the query are cached in the Local Directory Database. The origin Directory Agent forwards the result to the requesting Protocol Agent.

Problem Addressed by the Invention

Most, if not all of the various Access Agents supported by the NBBS (Networking BroadBand Services) architecture provide support for protocols that are highly hierarchical by nature. The term "hierarchical" means that the devices attached to the network follow a Client/Server model. Many end-users which can be called "Clients" look for services and information. To that end, these Clients access a limited number of information and service providers which can be called "Servers". It is a fact which can be observed in most networks that the number of Clients is much more higher than the number of Servers. Consequently, flows of communication requests are converging from said many Clients to these few Servers.

For example, end-user terminals (Clients) can use Frame Relay (or ATM) capable devices to access services in WEB Servers or other Internet or Intranet Server Applications (Servers). the Frame Relay (or ATM) Access Agent provides a Frame Relay (or ATM) Bearer Service across the NBBS network.

In another example, multiple Systems Network Architecture (SNA) terminals can use the Data Link Switching (DLSw) Access Agent for accessing a some rather limited number of expensive and complex SNA devices (a communication controller or an establishment controller), said devices providing a physical access (channel attachment) to computers hosting applications.

As the external protocols supported by the NBBS architecture are almost always hierarchical, the traffic transported across the NBBS network is never balanced (any to any, peer to peer). This is a fact that many end user devices or Clients, want to access a limited number of server devices or Servers.

Looking at the way the NBBS Directory Services have been defined and implemented, this hierarchical characteristic of data (or voice/video) traffic has serious negative implications on the network behavior. All end-user devices that are using a given protocol want to access a very limited number of server sites. Therefore, all the Access Agents attaching these end-user devices attempt to locate these very few possible destinations. Unfortunately, the NBBS mechanisms have been defined to optimize resource query (search) flows once a target resource has already been located as a result of a previous search from the same Access Agent. This is the only case when directed (point to point, unicast) query flows are used instead of the undirected (multipoint, multicast) query flows.

Due to the hierarchical nature of the external protocols supported by the NBBS architecture, this mechanism presents the following major drawbacks:

high consumption of node processing resources, high consumption of network bandwidth.

All of the access agents that service end-user devices for a given protocol attempt to locate the same destinations (the server locations). This results in the generation of multiple NBBS locate flows (Undirected Explicit Queries). These query messages are NBBS control messages broadcasted by means of a spanning tree to every node within the network.

In a network that is in steady state, when server resources have previously already been located, the NBBS architecture allows the use of point-to-point locate flows (Directed Explicit queries). However, for very dynamic networks (where new devices are added, nodes come and go), multiple quasi simultaneous undirected explicit query multicast messages may lead to an excessive consumption of network nodes processing resources. NBBS nodes may be incapable of sustaining the requested rate of connection requests. This may result in an increase of the latency time for setting up communications across the network. Additionally, the multiple multicast messages distributed to every node within the network increase the flow control overhead over the network spanning tree links.

This phenomenon is particularly damaging in case of NBBS network failures (partial or complete), followed by recoveries, where all end-user devices attempt, at the same time, to reconnect to their destination server applications.

SUMMARY OF THE INVENTION

The present invention relates to packet switching networks and more particularly to a method and system for dynamically pre-loading the Local Directory Database (LDB) of access nodes with the location of more frequently requested resources, in a packet switching network comprising access nodes and transit nodes interconnected with transmission links, each access node comprising a Local Directory Database comprising information related to the location of the resources it provides access to, each access node supporting one or a plurality of communication protocols for accessing said resources. The method, in an origin access node, comprises the steps of:

declaring each locally supported communication protocol for participating to control message exchanges between nodes supporting a same communication protocol;

receiving a message to locate a target resource;

searching for information related to the location of the target resource in the Local Directory Database.

If the Local Directory Database does not comprises any information related to the location of the target resource:

broadcasting an undirected message to the other access nodes in the network to locate the target resource;

receiving a control message from the destination access node providing access to the target resource, this control message comprising information related to the location of the target resource;

storing the information related to the location of the target resource in the Local Directory Database.

In an access node, the method according to the present invention comprises the steps of:

declaring each locally supported communication protocol for participating to control message exchanges between nodes supporting a same communication protocol;

receiving a control message from a destination access node providing access to a target resource, this control message comprising information related to the location of this target resource;

If the Local Directory Database does not comprises any information related to the location of this target resource:

storing the information related to the location of the target resource in the Local Directory Database.

In a destination access node, the method according to the present invention comprises the steps of:

receiving a undirected message from an origin access node to locate a target resource;

determining whether access to this target resource is provided or not;

If access to this target resource is provided:

determining the communication protocol used by this target resource;

broadcasting to access nodes supporting the same communication protocol a control message comprising information related to the location of the target resource.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

High Speed Packet Switching Networks

Figure 1:
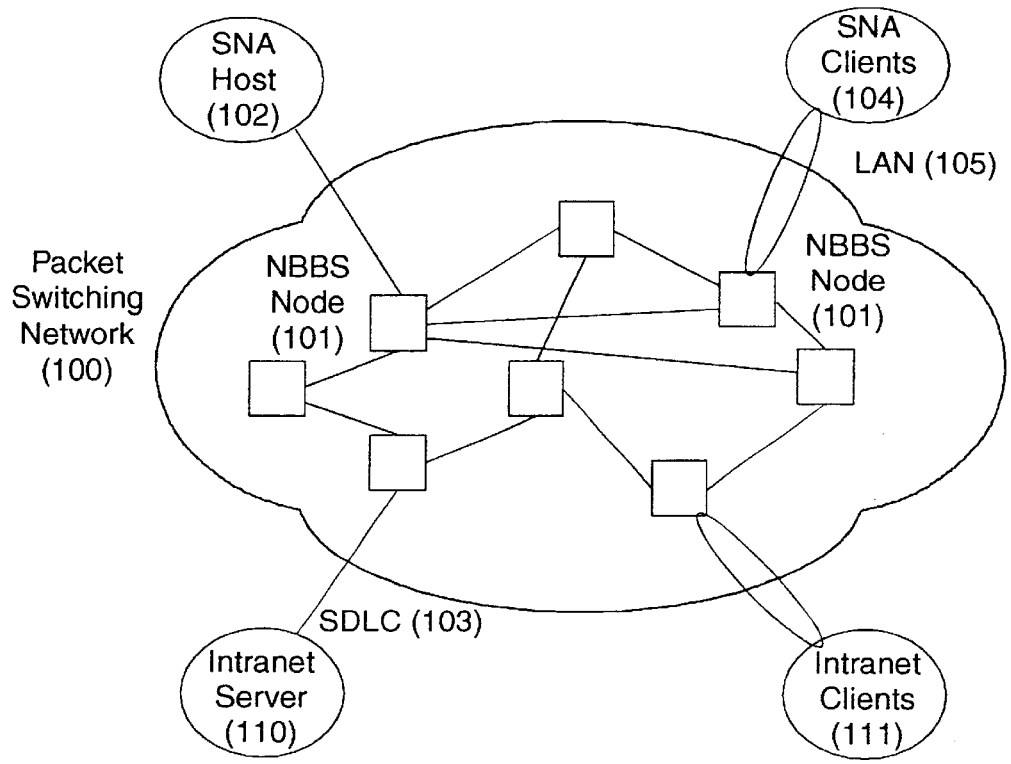
FIG. 1 shows a typical NBBS (Networking BroadBand Services) network comprising a plurality of nodes and links.

FIG. 1 is a general view of an NBBS (Networking BroadBand Services) network (100) comprising eight nodes (101) interconnected by means of high speed communication links called Trunks. The access to the network by the users is realized through Access Nodes located at the periphery of the network. These Access Nodes comprise one or more Ports, each port providing an access point for attaching external devices to the network and for performing the conversions required for the transport of the end user data flows across the network from and to other external devices. Some external devices are Client devices such as SNA terminals (104) or Intranet workstations (111), while other devices are Server devices such as SNA Host mainframes (102) or Intranet Servers (110).

Routing Points

Each NBBS network node includes a Routing Point where the incoming data packets are selectively routed on the outgoing Trunks towards the neighboring Transit Nodes. Such routing decisions are made according to the information contained in the header of the data packets. In addition to the basic packet routing function, the network nodes provide ancillary services such as:

the determination of routing paths for packets originated in the node, directory services for finding and updating location information about network users and resources, the maintenance of a consistent view of the physical network topology, including link utilization information, and the reservation of the resources at the access points of the network.

All the information necessary for the routing function, about the nodes and transmission links connected to the nodes, are contained in a Network Topology Database. Under steady state conditions, every Routing Point has the same view of the network. The network topology information is updated when new links are activated, new nodes added to the network, when links or nodes are dropped or when link loads change significantly. The fact that the network topology is kept current in every node through continuous updates allows dynamic network reconfigurations without disrupting end users logical connections.

Network Control Services

The Network Control Services are those that control, allocate, and manage the resources of the physical network. Each Routing Point has a set of the foregoing functions in the Route Controller and uses it to facilitate the communications (connection-oriented or connectionless) between users applications. The Network Control Services include in particular:

Directory Services for retrieving and maintaining information about network users and resources.

Bandwidth Management for processing the bandwidth reservation and maintenance messages, and for monitoring the current reservation levels on links.

Path Selection for choosing the best path between origin and destination nodes within the network based on the user's traffic characteristics, quality of service requirements and link utilization levels.

Control Spanning Tree for establishing and maintaining a routing tree among the network nodes, for using it to distribute control information (in parallel) including link utilization, and for updating the Topology Database of the nodes with new network configurations or link/node failures.

Topology Update for distributing and maintaining, using the Spanning Tree, information about the logical and physical network (including link utilization information) in every node.

Congestion Control for enforcing the bandwidth reservation agreements which are established at the set up time between the network's users and the network, and for estimating actual bandwidth and for adjusting reservation if necessary during the life of the communication.

Topology Database (TDB)

The Topology Database contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilization which includes dynamic characteristics like current bandwidth (used and reserved), real-time measurements . . .

The Topology Database is organized as follows: to each resource in the network, nodes or links, is associated an entry in the database. In particular, each link entry includes the following characteristics:

the link physical properties
  transmission medium and speed,
  routing mode supported,
  maximum packet size,
  link buffer capacity,
  propagation delay,
  bandwidth reservation supported . . .

the link state
  on-line (link can accept user connections),
  quiescent (link cannot accept additional user connections, but existing connections continue),
  off-line (link cannot accept user connections and existing connections are cancelled) . . .
the link utilization
  real-time measurements,
  reserved bandwidth, . . .

The Topology maintenance consists of advertising and gathering the updates that occur inside the network. Changes can be of three types:

The first type deals with link physical properties: additional link, link removal, reconfiguration . . .

The second type deals with link state.

The third type deals with dynamic link utilization.

The concept of distributed topology assumes that each node has the same view of the network.

Access Services

A major capability of most high speed networks is their ability to support a diverse range of high speed multimedia telecommunication services using common equipment. Each Access Service (also called Access Agent) provides support for a particular set of telecommunication services—ATM (Asynchronous Transfer Mode), FR (Frame Relay), PCM (Pulse Code Modulation) voice, Circuit emulation, HDLC (High-level Data Link Control) . . . —and enables Access Agents to transport traffic across a common network.

Figure 2:
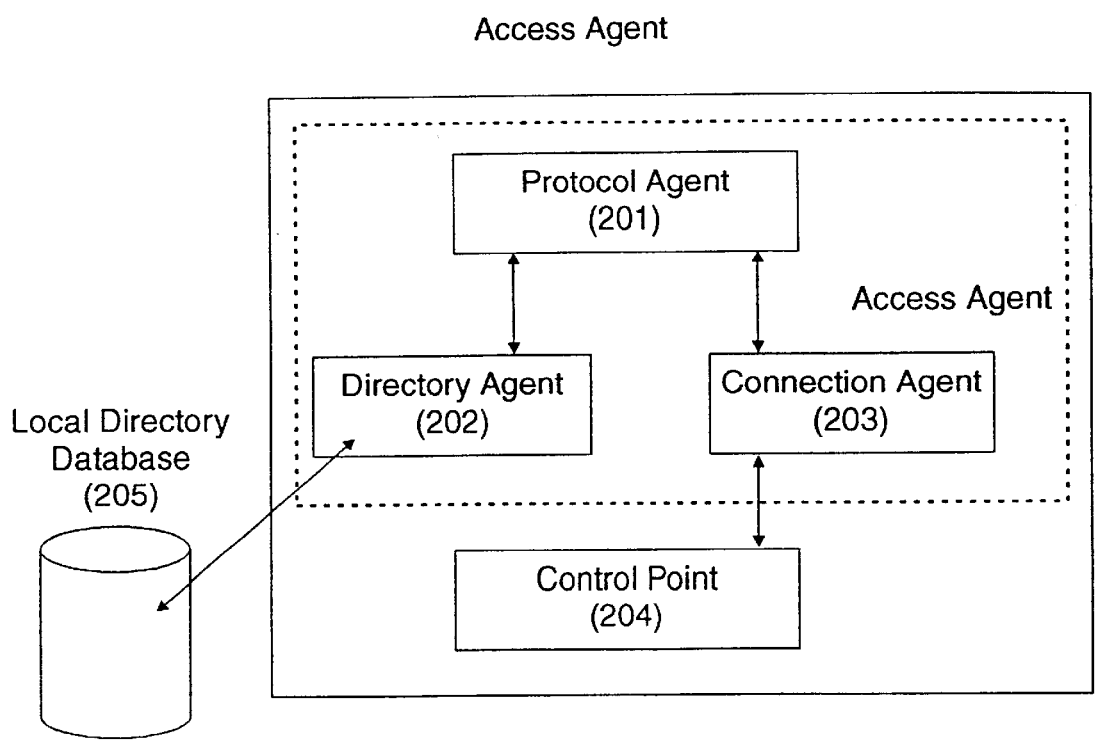
FIG. 2 describes the structure of an Access Agent in an NBBS access node.

Each NBBS network node comprises one or many of these Access Agents, depending on the physical interfaces it attaches to and on the access protocols it understands and supports. Access Agents are located in the access nodes and in a preferred embodiment in the access link interfaces of the adapters connected to external communication devices. As shown in FIG. 2, an Access Agent comprises three logically separate components:

a Protocol Agent (PA) (201) which understands and interprets the access protocol (for instance the System Network Architecture (SNA) protocol), a Directory Agent (DA) (202) in charge of locating resources across the network, and a Connection Agent (CA) (203) which establishes connections between Access Agents.

Protocol Agent (201)

The external behavior of a particular Access Agent is primarily characterized by the Protocol Agent as it is responsible for participating in protocol exchanges with attached external devices and networks and mapping these protocols to the protocols used by the backbone network. The Protocol Agent (201) uses the Directory Agent (202) to locate the various resources with which it needs to communicate within the network. The Protocol Agent then uses the Connection Agent (203) to establish and maintain reserved or best effort network connections with other Access Agents. Such network connections can then be used to transport data traffic such as SNA (Systems Network Architecture) data.

Directory Agent (202)

The Directory Agent is responsible for the registration and localization of information related to services provided by the Access Agent. The Directory Agent uses a Local Directory Database (205) and provides a distributed directory service throughout the network. The Directory Agent performs, in particular, three main functions:

Registration of users available through its Access Agent.

Localization of users on behalf of the Protocol Agent.

Response to queries to locate users that are received from other Directory Agents.

Users of the Network

A user is identified uniquely by its "resource name", which describes the user in its native protocol. The Access Agent in the access node communicates with users using their native protocols and names, but uses the particular network protocols and names when communicating with other network nodes. Directory Services is responsible for the mapping of a resource name into a particular network name.

The user's resource name is specified using the following three value:

Resource Identifier Type: this describes the addressing scheme used for this user (E.164, X.121, NSAP, . . . ).

Resource Identifier: this identifies a user within the syntax of the network described by the resource identifier type.

Resource Identifier Prefix: The prefix is used to group together users of the same resource identifier type. The prefix is optional and used when directory services implements directory sets.

Distributed and Local Directory Database

Directory services use a distributed directory database. Each Directory Agent maintains its own Local Directory Database which contains information about users of the network. A Local Directory Database has records for a subset of all the users of the network. Combining all the Local Directory Databases from the Directory Agents would give a complete view of the distributed directory database. This is different from the Topology Services with its fully replicated Topology Database that give every node a complete view of the network's topology.

A Local Directory Database agent is managed by each Directory Agent. A node will have multiple Local Directory Databases if there are multiple Access Agents within the node. From a view point of directory services on a node, there are two sorts of users:

Local users: local users are those which gain access to the network through this Directory Agent.

Remote users: remote users are those which gain access to the network through a different Directory Agent.

The directory database contains a number of directory entries. An entry is present for each local user. There are also entries for some of the remote users. The information which is kept in a directory entry includes among other parameters:

resource identifier and prefix; resource identifier type;

network addresses of the resource's Access Agent components (Directory Agent, Protocol Agent, Connection Agent);

etc.

Figure 3:
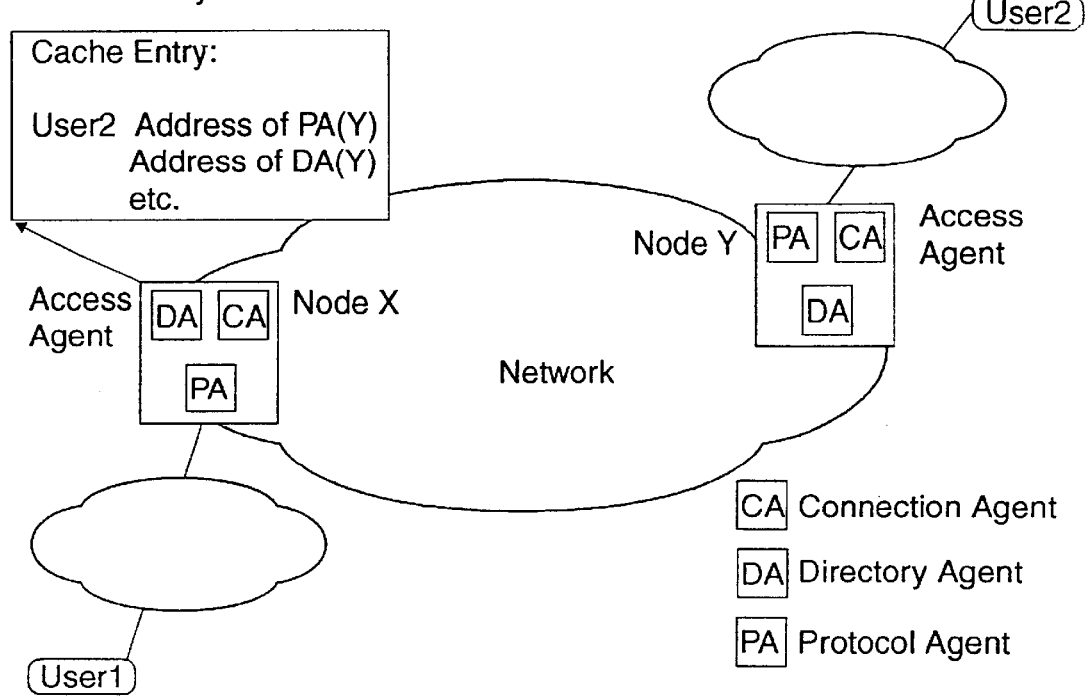
FIG. 3 shows two users establishing a communication over a packet switching network.

FIG. 3 shows two users who are establishing a communication in a network. It is assumed that User 1 (who is connected to node X), is setting up communication with User 2 (connected to node Y). Directory services on node X happens to have a cache entry for User 2 as a result of a previous query. However, just knowing the external name (the resource name) is not enough to calculate a path across the network. The information about the access agent addresses is required because this is how a remote user is located and a network connection established.

Information in the Local Directory Database can come from different sources:

Home entry: entries for local or remote users are generated in the local node using configuration information provided by the customer.

Registered entry: information about local users can be provided using signaling as a result of an external search.

Cached entry: remote users are located as a result of distributed queries (searches), and the information cached.

Distributed Queries

Directory services always inspect the Local Directory Database for a target user.

If the target user is a local user, then a distributed query is not required.

If a Directory Agent needs to inspect another part of the distributed directory database, a distributed query is used in order to locate a target user.

The distributed queries are so called because it is a search which is distributed among a group of remote Directory Agents. Distributed queries are sent from an origin Directory Agent to one or more destination Directory Agents, using either a directory set (a directory set is a group of Directory Agents which support users with the same longest matching address prefix) or the Spanning Tree.

Undirected Explicit Queries

This type of query is used if the Local Directory Database doe not contain any information about the user to be located. The origin Directory Agent multicasts the query to the appropriate directory group using a default distribution tree (a default distribution tree is a tree which spans all the members of a particular directory set). A remote Directory Agent will only reply to this type of query if it provides access to the destination user. A positive reply means that the destination user is a local member of the directory database of the destination Directory Agent. When a Directory Agent replies positively to a query, it will provide the location of the target user, in terms of the addresses of its access agent components.

Connection Agent (205)

The Connection Agent is responsible for the establishment and ongoing maintenance of network connections that are provided by the Network Connection Layer. The Protocol Agent uses the Connection Agent to set up, maintain and take down the various network connections that are required to support the services provided by the Access Agent.

Functional Addresses

In the NBBS architecture, a number of reserved labels known as inter node or intra node Functional Addresses are implemented by every NBBS node. These predefined labels are reserved for the Network Control Services and are used to multicast control messages through the network or the node (preferably using the label swapping transfer mode). There are two categories of Functional Addresses:

Internode Functional Addresses

They are used for the control messages that use the network spanning tree as the transport mechanism between all NBBS nodes within the network. Internode Functional Addresses include for example:

a Functional Address for Topology Services, which is used for distributing topology database updates.

a Functional Address for Directory Services, which is used for undirected explicit queries.

Access Agent Specific Addresses, used to transport information between all Access Agents of a given type.

Generally, internode Functional Addresses are used:

a) to allow for multicasting capabilities between groups of destinations using the network spanning tree, and b) to multicast on a network wide basis control messages to every node within the network.

Each of the users of the network spanning tree has a predefined Functional Address. In a preferred embodiment, a Functional Address is a label reserved in every node to support the label swap transfer mode. The network connection layer does not have to go through the connection establishment process for these network connections. An implicit multipoint-to-multipoint network connection exists for each of the users of the network spanning tree.

Intranode Functional Addresses

These Functional Addresses are used to deliver a message to multiple destinations within an NBBS node.

In a preferred embodiment of this invention, the method of pre-loading in the Local Directory Database of network nodes, the locations that are mostly requested will make use of internode functional addresses.

Pre-Loading of Local Directory Databases

The present invention uses the NBBS (Networking BroadBand Services) internode Functional Address to allow a "probable" destination Access Agent to pre-populate the Local Directory Database of multiple "probable" origin Access Agents within the NBBS network. A "probable" destination Access Agent is an Access Agent that provides access to or from a "server" resource, while a "probable" origin access agent is an Access Agent that provides access to, or from client resources.

During an initialization phase, the Protocol Agent located in an Access Agent, asks the node Control Point to be associated with an internode Functional Address. Each protocol has its own Functional Address (or set of Functional Addresses) attributed by the NBBS architecture. Then, this Functional Address corresponds to the protocol supported by the Access Agent. In the present application, we say that the Protocol Agent "marks" the Functional Address (this can be done for example by means of local tables within each access node). This means that the Protocol Agent uses the protocol corresponding to the Functional address and wants to participate to control message exchanges using said Functional Address. This Functional Address mechanism constitutes a communication channel (or logical connection) dedicated to all Access Agents within a given protocol. This channel is used to exchange control messages between all currently active Access Agents within a same protocol (all Access Agents that have marked the same Functional Address).

When a destination Access Agent, after receipt of a multicasted search request (an undirected explicit query), has located the target resource, the Protocol Agent according to the present invention determines that a "server" resource is attempted to be located. The mechanisms disclosed within the present invention define as Server resources, all the resources that are the target of a distributed multicasted query (an Undirected Explicit Query). Receipt of a distributed (multicasted) query (instead of a directed explicit query or unicasted query) implies that one or probably several origin Access Agents have no information about the "Server" resource. On the other hand, resources that are the target of a unicasted Directed Explicit Query are not considered as Server resources. The destination Protocol Agent after identification of a "Server" resource, issues a "SERVER RESOURCE LOCATION" control message, describing the local "Server" resource that has just locally been found. This new control message is sent over the Functional Address communication channel, using the network Spanning Tree mechanism, and therefore reaches all the Protocol Agents that have previously "marked" the Functional Address (all the Protocol Agents that participate to the control message exchanges using the Functional Address). The control message contains the information required to create a record in a Local Directory Database (basically, the addressing information about the destination Access Agent providing access to the target resource). This control message, which is strictly similar to a "LOCATE REPLY, FIND REPLY" NBBS Directory Service control message, is sent over the network Spanning Tree using the internode Functional Address associated to the protocol supported by the destination Access Agent. All the origin Access Agents receiving this control message update their Local Directory Database accordingly. After the sending of this "SERVER RESOURCE LOCATION" control message, the normal NBBS process within the destination Access Agent is performed, i.e. an Undirected Explicit Query positive reply (a "LOCATE REPLY, FIND REPLY") is returned to the origin Access Agent.

Initialization of Access Agents

Figure 4:
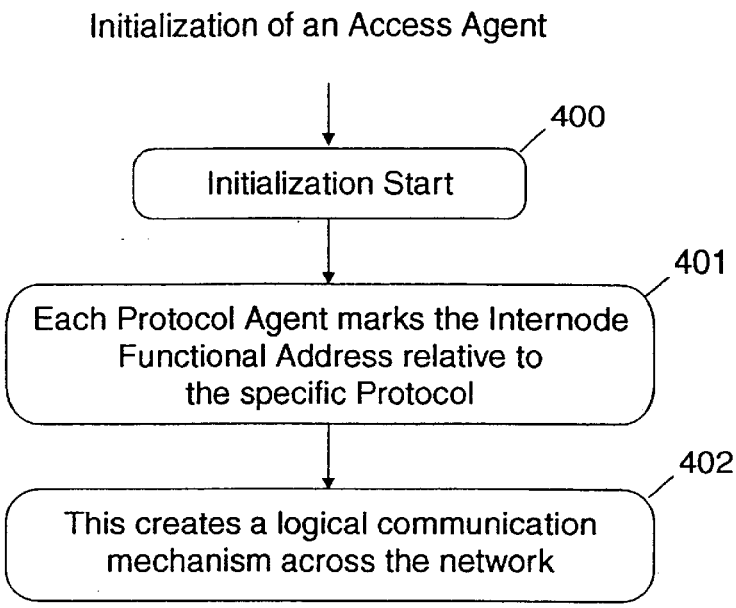
FIG. 4 shows the initialization process of an Access Agent, according to the present invention.

FIG. 4 is a flow chart of the method of initializing Access Agents according to the present invention. The initialization phase (400) comprises the following steps:

(401) Each Protocol Agent "marks" the internode Functional Address associated to the protocol it supports.

This marking creates a logical communication mechanism (402) across the network Spanning Tree. A message sent over this internode Functional Address reaches all the Protocol Agents that are member of the Functional Address (all those Protocol Agents that have marked the Functional Address during their initialization phase).

Origin Access Agents

Figure 5:
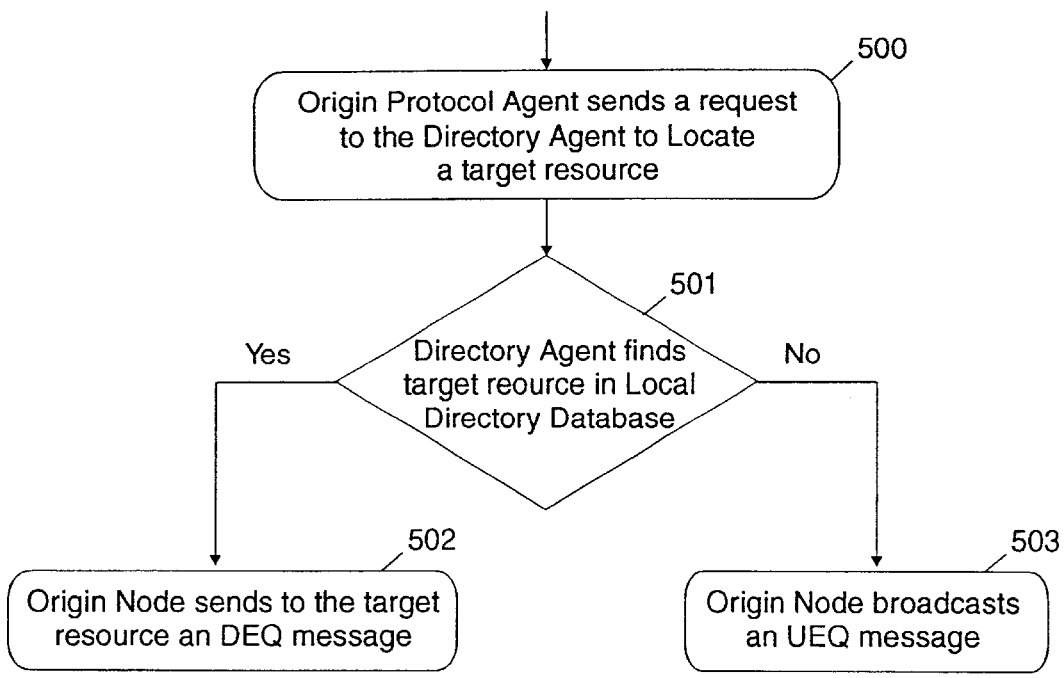
FIG. 5 is a flow chart of the method, in an origin Access Agent, of locating a target resource, according to the present invention.

FIG. 5 is a flow chart of the method for locating a target resource in an origin Access Agent. When a Directory Agent inside a node, receives (500) from its Protocol Agent a request to locate a target resource, two cases may occur (501):

Case a)

The Directory Agent, finds within its Local Directory Database the addressing information related to the target resource. A Direct Explicit Query message (an Unicast message) is sent (505) to the destination Access Agent in charge of accessing the target resource to verify the addressing information associated with the Destination Access Agent. The information to be verified is locally found by the origin Access Agent within its Local Directory database.

Case b)

The Directory Agent does not find any locally available addressing information related to the requested target resource. An Undirect Explicit Query message (a multicast message) is broadcasted (503) to locate this target resource.

Destination Access Agents

Figure 6:
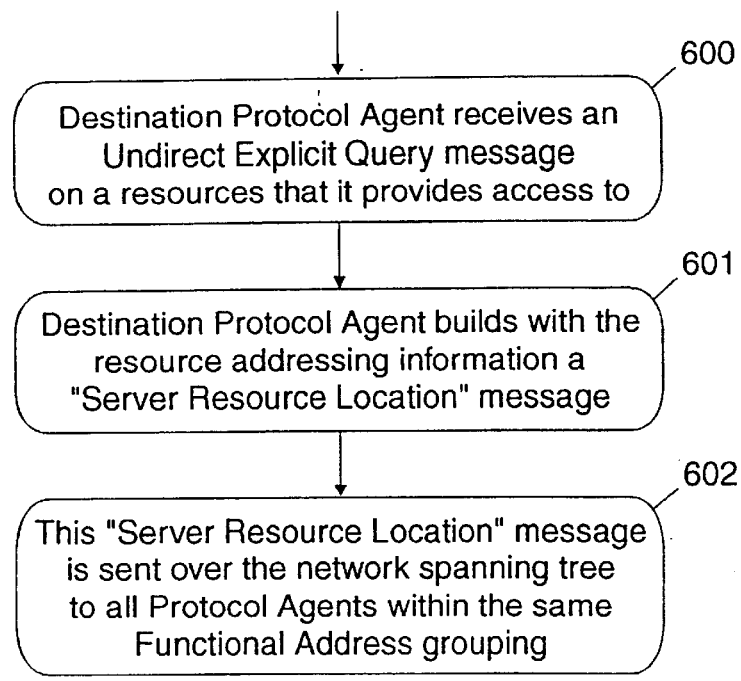
FIG. 6 is a flow chart of the method, in a destination Access Agent, of pre-loading the Local Directory Database of each potential origin Access Agents, according to the present invention.
Figure 7:
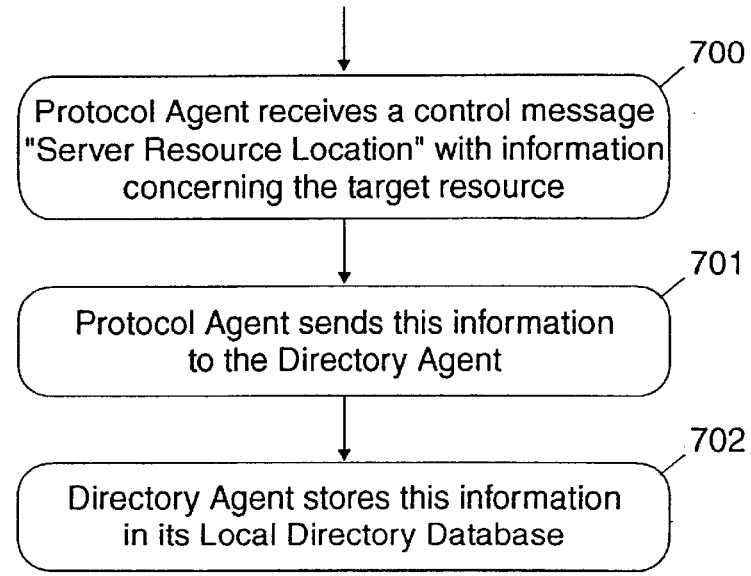
FIG. 7 is a flow chart of the method of processing a "SERVER RESOURCE LOCATION" control message in a Protocol Agent, according to the present invention.

FIG. 6 is a flow chart of the method in a destination Access Agent, of pre-loading the Local Directory Databases of all potential origin Access Agents. When a destination Access Agent receives a request to locate a target resource (an Undirected Explicit Query), the request is forwarded to the Protocol Agent. The Protocol Agent determines whether the Access Agent provides access to that target resource or not. If yes, the normal NBBS process is triggered. The Directory Agent replies positively to the origin Access Agent that sent the original request.

The destination Protocol Agent that received the Undirected Explicit Query (600) is at this point aware that a search for a resource it provides access to, has been requested by an origin Access Agent. In order to pre-load the Local Directory Database of all potential origin Access Agents, the destination Protocol Agent performs the following operations:

(601) A control message called "SERVER RESOURCE LOCATION" comprising all the required addressing information about the resource that has just been located is built.

(602) The "SERVER RESOURCE LOCATION" control message is sent over the network Spanning Tree, using the internode Functional Address used by Access Agents. As a consequence, this control message reaches all Protocol Agents within the same protocols, i.e. those Protocol Agents that have previously marked the associated internode Functional Address corresponding to the protocol supported by the Access Agent.

Local Directory Database Update

Each Protocol Agent that receives (700) the Control Message "SERVER RESOURCE LOCATION" describing the addressing information to access a target resource requests (701) its local Directory Agent (702) to add the corresponding information within the Local Directory Database. Later on, when the Directory Agent will receive a request for searching this target resource, the information will be available locally and therefore a Directed Explicit Query will be used instead of an Undirected Explicit Query (a Unicast instead of a Multicast message).

Advantages Associated with the Invention

The following advantages are associated to the present invention:

The existing Directory Agent architecture and corresponding implementations do not need to be changed.

The NBBS control flows are unchanged, only a single new control message "SERVER RESOURCE LOCATION" is required.

The migration is easy, as Protocol Agents not implementing the present invention may coexist within the same network with Protocol Agents implementing the present invention. As Access Agents not implementing the invention do not mark the protocol Functional Address, they are not involved in the process described by the invention. However, they are allowed to coexist with the Access Agents implementing the present invention.

The system auto initializes itself when new Access Agents come in (or go away) and join (or leave) the Functional Address mechanism.

Most undirected search flows are now replaced by directed flows. This solves the two problems previously raised (network control overhead, consumption of node processing capabilities)

While the invention has been particularly shown and described with reference to a preferred embodiment, it will be understood that various changes in form and detail may be made therein without departing from the spirit, and scope of the invention.

What is claimed is:

1. The method wherein receiving a control message from a destination access node providing access to a target resource further comprises receiving information that was broadcast, using the internode Functional Address, by the destination access node, to access nodes supporting the same communication protocol as the target resource.

2. A method for dynamically pre-loading access nodes with the location of more frequently requested resources, said method comprising:

an access node in a network declaring a locally supported communication protocol for participating in control of a message exchange using said locally supported communication protocol between access nodes, wherein said locally supported communication protocol is associated with an internode Functional Address, and wherein declaring said locally supported communication protocol includes marking said internode Functional Address as being associated with said locally supported communication protocol;

receiving a control message from a destination access node providing access to a target resource, said control message comprising information related to a location of said target resource;

determining that a Local Directory Database does not include said information related to said location of said target resource; and storing said information related to said location of the target resource in said Local Directory Database.

3. The method according to claim 1, wherein:

said step of an access node in a network declaring a locally supported communication protocol further comprises an origin access node in a network declaring a locally supported communication protocol and wherein said method further comprises:

receiving a message to locate a target resource;

searching for information related to the location of the target resource in the Local Directory Database; and broadcasting an undirected message to the other access nodes in the network to locate said target resource.

4. The method of claim 2, wherein said step of an access node in a network declaring a locally supported communication protocol further comprises an origin access node in a network declaring a locally supported communication protocol and wherein said method further comprises:

receiving a message to locate a target resource;

searching for information related to a location of said target resource in a Local Directory Database; and broadcasting an undirected message to a second access node in said network to locate said target resource.

5. A method for dynamically pre-loading access nodes with the location of more frequently requested resources, said method comprising:

a destination access node in a network declaring a locally supported communication protocol for participating in control of a message exchange using said locally supported communication protocol between access nodes, wherein said supported communication protocol is associated with an internode Functional Address, and wherein declaring said supported communication protocol comprises includes marking an internode Functional Addresses associated said locally supported communication protocols;

receiving an undirected message from an origin access node to locate a target resource;

determining that access to said target resource is provided;

determining the communication protocol used by said target resource; and broadcasting to access nodes supporting the same communication protocol, a control message comprising information related to the location of the target resource.

6. The method according to claim 5, wherein broadcasting to access nodes supporting the same communication protocol, a control message comprising information related to the location of the target resource, further comprises broadcasting a control message comprising information related to said location of said target resource the internode Functional Address over a network spanning tree.

7. An access nodes buffering information regarding the location of more frequently requested resources, said access node comprising:

means within an access node in a network, for declaring a locally supported communication protocol for participating in control of a message exchange using said locally supported communication protocol between access nodes, wherein said locally supported communication protocol is associated with an internode Functional Address, and wherein declaring said locally supported communication protocol includes marking said internode Functional Address as being associated with said locally supported communication protocol;

means for receiving a control message from a destination access node providing access to a target resource, said control message comprising information related to a location of said target resource;

means for determining that a Local Directory Database does not include said information related to said location of said target resource; and means for storing said information related to said location of the target resource in said Local Directory Database.

8. The access node of claim 7, wherein said means for receiving a control message from a destination access node providing access to a target resource further comprises means for receiving information that was broadcast, using said internode Functional Address, by said destination access node, to access nodes supporting the same communication protocol as the target resource.

9. The access node of claim 7, wherein said means within an access node in a network for declaring a locally supported communication protocol further comprises means within an origin access node in a network for declaring a locally supported communication protocol and wherein said system further comprises:

means for receiving a message to locate said target resource;

means for searching for information related to said location of said target resource in a Local Directory Database; and means for broadcasting an undirected message to a second access node in said network to locate said target resource.

10. The access node of claim 8, wherein:

said means within an access node in a network for declaring a locally supported communication protocol further comprises means for an origin access node in a network declaring a locally supported communication protocol; and wherein said system further comprises:

means for receiving a message to locate said target resource;

means for searching for information related to the location of said target resource in said Local Directory Database; and means for broadcasting an undirected message to said other access nodes in said network to locate said target resource.

11. An access node buffering information regarding the location of more frequently requested resources, said access node comprising:

means, within a destination access node in a network, for declaring a locally supported communication protocol for participating in control of a message exchange using said locally supported communication protocol between access nodes, wherein each supported communication protocol in the network is associated with an internode Functional Address, and wherein said means declaring said supported communication protocol includes means for marking an internode Functional Addresses associated said locally supported communication protocols;

means for receiving an undirected message from an origin access node to locate a target resource;

means for determining that access to said target resource is provided;

means for determining a communication protocol used by said target resource; and means for broadcasting to access nodes supporting said communication protocol, a control message comprising information related to the location of the target resource.

12. The access node of claim 11, wherein said means for broadcasting to access nodes supporting said communication protocol, a control message comprising information related to the location of the target resource, further comprises means for broadcasting a control message comprising information related to the location of the target resource, which message is broadcasted to access nodes using the internode Functional Address over a network spanning tree.

13. A computer program product in a computer-readable medium for dynamically pre-loading an access node with the location of more frequently requested resources, said computer program product comprising:

a computer-readable medium;

instructions on the computer-readable medium for causing an access node in a network to declare a locally supported communication protocol for participating in control of a message exchange using said locally supported communication protocol between access nodes, wherein said locally supported communication protocol is associated with an internode Functional Address, and wherein declaring said locally supported communication protocol includes marking said internode Functional Address as being associated with said locally supported communication protocol;

instructions on the computer-readable medium for receiving a control message from a destination access node providing access to a target resource, said control message comprising information related to a location of said target resource;

instructions on the computer-readable medium for determining that a Local Directory Database does not include said information related to said location of said target resource; and instructions on the computer-readable medium for storing said information related to said location of the target resource in said Local Directory Database.

14. The computer-program product of claim 13, wherein said instructions for receiving a control message from a destination access node providing access to a target resource further comprise instructions on the computer-readable medium for receiving information that was broadcast, using said internode Functional Address, by said destination access node, to access nodes supporting the same communication protocol as said target resource.

15. The computer program product of claim 13, wherein said instructions within an access node in a network for declaring a locally supported communication protocol further comprise instructions within an origin access node in a network for declaring a locally supported communication protocol and wherein said computer program product further comprises:

instructions on the computer-readable medium for receiving a message to locate said target resource;

instructions on the computer-readable medium for searching for information related to said location of said target resource in a Local Directory Database; and instructions on the computer-readable medium for broadcasting an undirected message to a second access node in said network to locate said target resource.

16. The computer program product according to claim 14, wherein:

said instructions for an access node in a network declaring a locally supported communication protocol further comprise instructions for an origin access node in a network declaring a locally supported communication protocol; and wherein said computer program product further comprises:

instructions on the computer-readable medium for receiving a message to locate said target resource;

instructions on the computer-readable medium for searching for information related to the location of said target resource in said Local Directory Database; and instructions on the computer-readable medium for broadcasting an undirected message to the other access nodes in the network to locate said target resource.

17. A computer program product in a computer-readable medium for dynamically pre-loading an access node with the location of more frequently requested resources, said computer program product comprising:

instructions on the computer-readable medium for causing a destination access node in a network to declare a locally supported communication protocol for participating in control of a message exchange using said locally supported communication protocol between access nodes, wherein each supported communication protocol in the network is associated with an internode Functional Address, and wherein said instructions declaring said supported communication protocol includes instructions on the computer-readable medium for marking an internode Functional Addresses associated said locally supported communication protocols;

instructions on the computer-readable medium for receiving an undirected message from an origin access node to locate a target resource;

instructions on the computer-readable medium for determining that access to said target resource is provided;

instructions on the computer-readable medium for determining a communication protocol used by said target resource; and instructions on the computer-readable medium for broadcasting to access nodes supporting said communication protocol, a control message comprising information related to the location of the target resource.

18. The computer program product according to claim 17, wherein said instructions for broadcasting to access nodes supporting said communication protocol, a control message comprising information related to the location of the target resource, further comprise instructions for broadcasting a control message comprising information related to the location of the target resource, which message is broadcasted to access nodes using the internode Functional Address over a network spanning tree.

* * * * *